(12) United States Patent
Neet (10) Patent No.: US 11,418,078 B2
(45) Date of Patent: Aug. 16, 2022

(54) ELECTRIC MACHINE WITH STATOR HAVING A PLURALITY OF LEAD WIRES EXTENDING FROM A COMMON WINDING LAYER

(71) Applicant: BorgWarner Inc., Auburn Hills, MI (US)

(72) Inventor: Kirk E. Neet, Saline, MI (US)

(73) Assignee: BorgWarner Inc., Auburn Hills, MI (US)

( * ) Notice: Subject to any disclaimer, the term of this patent is extended or adjusted under 35 U.S.C. 154(b) by 251 days.

(21) Appl. No.: 16/819,360

(22) Filed: Mar. 16, 2020

(65) Prior Publication Data
US 2020/0220404 A1 Jul. 9, 2020

Related U.S. Application Data

(63) Continuation of application No. 15/900,898, filed on Feb. 21, 2018, now Pat. No. 10,615,655.
(Continued)

(51) Int. Cl.
*H02K 3/12* (2006.01)
*H02K 1/16* (2006.01)
(Continued)

(52) U.S. Cl.
CPC .............. *H02K 3/12* (2013.01); *H02K 1/165* (2013.01); *H02K 3/28* (2013.01); *H02K 3/48* (2013.01); *H02K 2213/03* (2013.01)

(58) Field of Classification Search
CPC ............ H02K 3/12; H02K 1/165; H02K 3/28; H02K 3/48; H02K 2213/03
(Continued)

(56) References Cited

U.S. PATENT DOCUMENTS

| 3,324,322 A | 6/1967 | Johns |
| 4,402,129 A | 9/1983 | Kreuzer et al. |

(Continued)

FOREIGN PATENT DOCUMENTS

| CN | 1340237 A | 3/2002 |
| CN | 102386705 A | 3/2012 |

(Continued)

OTHER PUBLICATIONS

International Search Report and Written Opinion of the International Searching Authority, PCT/US2018/018886, dated May 16, 2018, 10 pages.

*Primary Examiner* — John K Kim
(74) *Attorney, Agent, or Firm* — Bose McKinney & Evans LLP (57) ABSTRACT

An electric machine with a stator operably coupled with a rotor. The stator includes a stator core defining a plurality of slots. Each of the slots defines a plurality of layer positions located at different radial distances from a rotational axis of the electric machine. At least three windings are associated with each of the phases of the machine. In a first slot, a first winding is disposed in a first layer position. A second winding is disposed in a second layer position. A third winding is disposed in a third layer position. The first winding includes a first outside lead wire extending from the first slot. The second winding includes a second outside lead wire extending from a second slot. The third winding includes a third outside lead wire extending from a third slot. Each of the outside lead wires are in the first layer position.

17 Claims, 7 Drawing Sheets

Related U.S. Application Data (60) Provisional application No. 62/462,507, filed on Feb. 23, 2017.

(51) Int. Cl.
*H02K 3/28* (2006.01)
*H02K 3/48* (2006.01)

(58) Field of Classification Search
USPC .......................................................... 310/185
See application file for complete search history.

(56) References Cited

U.S. PATENT DOCUMENTS

| | | | |
|---|---|---|---|
| 6,201,332 B1 * | 3/2001 | Umeda | H02K 3/28 |
| | | | 310/179 |
| 6,787,961 B2 | 9/2004 | Neet et al. | |
| 6,882,077 B2 | 4/2005 | Neet | |
| 7,064,470 B2 | 6/2006 | Yokoyama et al. | |
| 7,679,253 B2 | 3/2010 | Neet | |
| 10,454,332 B2 | 10/2019 | Bogdan et al. | |
| 10,615,655 B2 * | 4/2020 | Neet | H02K 3/28 |
| 2003/0230949 A1 | 12/2003 | Ogawa et al. | |
| 2004/0119361 A1 | 6/2004 | Neet et al. | |
| 2006/0032040 A1 | 2/2006 | Neet | |
| 2006/0033394 A1 | 2/2006 | Ogawa et al. | |
| 2014/0091666 A1 | 4/2014 | Neumann | |
| 2015/0214803 A1 | 7/2015 | Zhang et al. | |
| 2016/0365765 A1 | 12/2016 | Neet | |
| 2017/0271937 A1 * | 9/2017 | Takei | H02K 3/38 |
| 2017/0310169 A1 | 10/2017 | Neet et al. | |
| 2018/0034333 A1 * | 2/2018 | Neet | H02K 3/28 |
| 2018/0241267 A1 * | 8/2018 | Neet | H02K 3/12 |
| 2018/0241270 A1 * | 8/2018 | Neet | H02K 3/18 |
| 2020/0220404 A1 * | 7/2020 | Neet | H02K 3/28 |

FOREIGN PATENT DOCUMENTS

| | | |
|---|---|---|
| CN | 102412638 A | 4/2012 |
| CN | 103339834 A | 10/2013 |
| CN | 204741354 U | 11/2015 |
| CN | 105393437 A | 3/2016 |
| CN | 205725221 U | 11/2016 |
| CN | 205753722 U | 11/2016 |
| JP | 2014-36559 A | 2/2014 |
| JP | 2014121214 A | 6/2014 |
| JP | 2015023672 A | 2/2015 |
| JP | 2015126630 A | 7/2015 |
| JP | 2015154582 A | 8/2015 |
| KR | 20150123388 A | 11/2015 |
| KR | 20160140495 A | 12/2016 |

* cited by examiner

ELECTRIC MACHINE WITH STATOR HAVING A PLURALITY OF LEAD WIRES EXTENDING FROM A COMMON WINDING LAYER

CROSS REFERENCE TO RELATED APPLICATIONS

This application is a continuation of U.S. Ser. No. 15/900,898 filed on Feb. 21, 2018 entitled ELECTRIC MACHINE WITH STATOR HAVING A PLURALITY OF LEAD WIRES EXTENDING FROM A COMMON WINDING LAYER which claims priority under 35 U.S.C. 119(e) of U.S. provisional patent application Ser. No. 62/462,507 filed on Feb. 23, 2017 entitled ELECTRIC MACHINE WITH STATOR HAVING A PLURALITY OF LEAD WIRES EXTENDING FROM A COMMON WINDING LAYER the disclosures of both of which are hereby incorporated herein by reference.

BACKGROUND

The present invention relates to electric machines.

Electric machines are used for several different purposes in modern vehicles. For example, electric machines are commonly employed as starters, alternators, traction motors and for other purposes. In these applications, the electric machine may act as a motor, generator or be selectively operable as either a motor or a generator.

There is an increasing demand for electric machines used in vehicle applications, as well as other non-vehicular applications, for an electric machine with reduced size and increased efficiency. Improvements in electric machine design which allow for cost efficient manufacture while meeting the increasingly stringent demands of modern vehicular applications are desirable.

Figure 1:
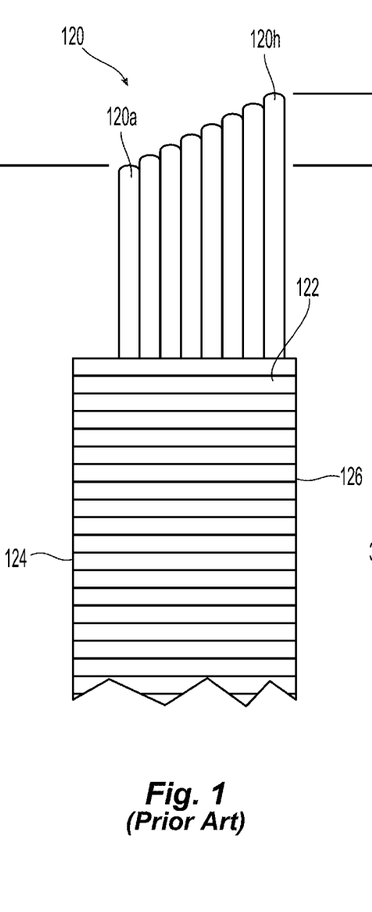
FIG. 1 is a schematic view of the end turns of a prior art stator.

FIG. 1 is a schematic view of end turns 120 extending in an axial direction from laminations 122 of a stator of the prior art. Laminations 122 have a radially outer surface 124 and a radially inner surface 126 and defines a central opening encircled by the radially inner surface 126. End turns 120 are part of winding wires wherein that all have the same length for a wrap of the winding regardless of which layer in which the wrap is disposed. A wrap, as used herein, refers to that portion of a winding wire that extends for 360 degrees about the stator core. After insertion of the windings into the slots of laminations 122, the heights of end turns 120 progressively vary from a radially outermost end turn 120*a*, which has the smallest height to a radially innermost end turn 120*h*, which has the largest height. End turn 120*a* may be said to be in a first layer and end turn 120*h* may be said to be in an eighth layer. The difference in heights of end turns 120 is due to the circumferential distance between slots being greater the more radially outward the winding layer is disposed. Thus, the radially outermost winding layer spans the longest circumferential distance between slots and has the shortest length available for end turn height. Because the radially outermost winding must have at least a minimum end turn height in order to clear the lamination, the more radially inward windings which span a shorter circumferential length have greater end turn heights. As a result, the heights of the radially inward layers can be excessively large or greater than ideal.

Figure 2:
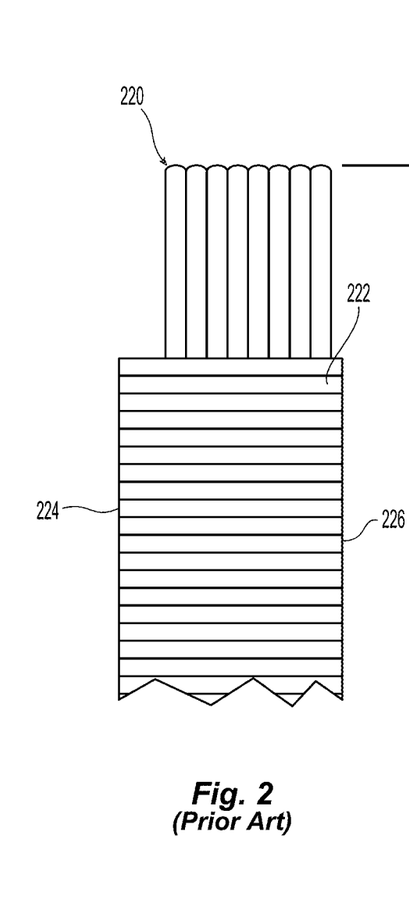
FIG. 2 is a schematic view of the end turns of another prior art stator.

FIG. 2 is a schematic view of end turns 220 extending in an axial direction from laminations 222 of another stator of the prior art. Laminations 222 have a radially outer surface 224 and a radially inner surface 226 and defines a central opening encircled by the radially inner surface 226. End turns 220 are part of windings or wires that all have different lengths so that, after insertion of the windings into the slots of laminations 222, the heights of end turns 220 are all equal. A wrap in the radially outermost layer has the largest length, and a wrap in the radially innermost winding has the shortest length. Although this design is efficient from a winding material perspective, having wires of different lengths makes manufacturing more complicated and costly.

Another issue with prior art windings is that the ends of the windings which extend outwardly to define leads which can be used to form an electrical connection with another winding or an external circuit member often extend at locations on the stator which they are difficult to handle and thereby increase the difficulty of manufacturing the electric machine.

SUMMARY

The present invention provides an electric machine having a winding pattern that enables an inexpensive manufacture of a compact and efficient electric machine which include a plurality of leads that all extend from the same winding layer of the stator assembly. This arrangement facilitates the efficient manufacture of the electric machine.

The invention comprises, in one form thereof, a multi-phase electric machine that includes a stator operably coupled with a rotor wherein the rotor is rotatable relative to the stator. The stator including a stator core and a plurality of windings defining a plurality of phases. The stator core defines a plurality of axially and radially extending slots which circumscribe the stator core and encircle a rotational axis of the electric machine. Each of the slots defines a plurality of layer positions located at different radial distances from the rotational axis. The plurality of windings are mounted in the slots of the stator core with each phase of plurality of phases defining a plurality of poles circumferentially distributed about the stator core. Each phase includes at least three of the plurality of windings. For one of the phases, in a first slot of a first pole, a first winding is disposed in a first layer position, a second winding is disposed in a second layer position, and a third winding is disposed in a third layer position, the first winding defining a first outside lead wire extending from the first slot. The second winding defines a second outside lead wire extending from a second slot of a second pole wherein the second winding is disposed in the first layer position in the second slot and the third winding is disposed in the second layer position of the second slot. The third winding defines a third outside lead wire extending from a third slot of a third pole wherein the third winding is disposed in the first layer position in the third slot. The first pole, the second pole, and the third pole are adjacent to each other with the second pole being disposed between the first and third pole and wherein the first layer position is a radially outermost layer position, the second layer position is disposed radially inward of the first layer position, and the third layer position is disposed radially inward of the second layer position.

In some embodiments, each of the first, second and third windings is respectively formed by a first wire and a second wire connected in series, wherein a first end of the first wire for the first, second and third windings respectively defines the first outside lead wire, the second outside lead wire and the third outside lead wire and wherein, a second end of the first wire for the first winding defines a first interior lead extending from a radially innermost layer position of the second pole, a second end of the first wire for the second winding defines a second interior lead extending from the radially innermost layer position of the third pole and a second end of the first wire for the third winding defines a third interior lead extending from the radially innermost layer position of a fourth pole, the fourth pole being adjacent the third pole with the third pole disposed between the fourth and second poles. In such embodiments, the windings of each phase may define at least six interior leads wherein the first, second and third interior leads are each connected to another interior lead extending from a radially innermost layer position to define a reversing end loop wherein each reversing end loop connects a clockwise extending wire to a counterclockwise extending wire.

In some embodiments, the one phase includes a fourth winding, the fourth winding defining a fourth outside lead wire extending from a fourth slot of a fourth pole, the fourth pole being adjacent the third pole with the third pole disposed between the fourth and second poles, the fourth winding being disposed in the first layer position in the fourth slot, in the second layer position in the third slot, in the third layer position in the second slot and in the fourth layer position in the first slot, the fourth layer position being disposed radially inwardly of the third layer position.

In an embodiment having such a fourth winding, each of the first, second, third and fourth windings may be respectively formed by a first wire and a second wire connected in series, wherein a first end of the first wire for the first, second, third and fourth windings respectively defines the first outside lead wire, the second outside lead wire, the third outside lead wire, and the fourth outside lead wire and wherein, a second end of the first wire for the first winding defines a first interior lead extending from a radially innermost layer position of the second pole, a second end of the first wire for the second winding defines a second interior lead extending from the radially innermost layer position of the third pole, a second end of the first wire for the third winding defines a third interior lead extending from the radially innermost layer position of the fourth pole, and the a second end of the first wire for the fourth winding defines a fourth interior lead extending from the radially innermost layer position of a fifth pole, the fifth pole being adjacent the fourth pole with the fourth pole disposed between the fifth and third poles. In such an embodiment, the windings of each phase may define at least eight interior leads and the first, second, third and fourth interior leads are each connected to another interior lead extending from a radially innermost layer position to define a reversing end loop wherein each reversing end loop connects a clockwise extending wire to a counterclockwise extending wire.

In some embodiments of the electric machine, each pole is defined by windings which are sufficient to fill two slots and wherein each pole includes windings disposed in three adjacent slots.

In some embodiments of the electric machine, each of the first, second and third windings includes two wires connected in series at interior leads extending from a radially innermost layer position, each of the series connections between the interior leads defining a reversing end loop wherein each reversing end loop connects a clockwise extending wire to a counterclockwise extending wire.

In some embodiments of the electric machine, each of the first, second and third winding are formed by two wires connected in series, wherein:

first and second wires extend from the first layer position of different slots of the first pole to define outside lead wires;

third and fourth wires are disposed in the second layer position of the different slots of the first pole and are extend from the first layer position of different slots of the second pole to define outside lead wires;

fifth and sixth wires are disposed in the third layer position of the different slots of the first pole and are disposed in the second layer position of the different slots of the second pole and extend from the first layer position of different slots of the third pole to define outside lead wires; and wherein the first wire forms the first outside lead wire and one of the two wires of the first winding, the third wire forms the second outside lead wire and one of the two wires of the second winding, and the fifth wire forms the third outside lead wire and one of the two wires of the third winding.

Such an embodiment having first through sixth wires may be configured such that the first and second wires define interior leads extending from radially innermost layer positions of slots of the second pole, the third and fourth wires define interior leads extending from radially innermost layer positions of slots of the third pole and the fifth and sixth wires define interior leads extending from radially innermost layer positions of slots of a fourth pole, the fourth pole being adjacent the third pole with the third pole disposed between the second and fourth poles; and wherein each of the interior leads of the first through sixth wires are connected in series to another interior lead to define a reversing end loop wherein each reversing end loop connects a clockwise extending wire to a counterclockwise extending wire. Such an embodiment may be further configured such that, for each pole not including an exterior lead wire or an interior lead, the pole includes one slot wherein the first wire is in the first layer position, the third wire is in the second layer position and the fifth wire is in the third layer position and, in another slot of the pole, the second wire is in the first layer position, the fourth wire is in the second layer position and the sixth wire is in the third layer position.

In some embodiments having first through sixth wires, the one phase may also include a fourth winding formed by two wires connected in series, the fourth winding defining a fourth outside lead wire extending from a fourth slot of a fourth pole, the fourth pole being adjacent the third pole with the third pole disposed between the fourth and second poles, the fourth winding being disposed in the first layer position in the fourth slot, in the second layer position in the third slot, in the third layer position in the second slot and in the fourth layer position in the first slot, the fourth layer position being disposed radially inwardly of the third layer position; and wherein the windings of the one phase further include a seventh wire and an eighth wire wherein the seventh and eighth wires are disposed in the fourth layer position of the different slots of the first pole and are disposed in the third layer position of the different slots of the second pole and are disposed in second layer position of the different slots of the third pole and extend from the first layer position of different slots of the fourth pole to define outside lead wires; and wherein the seventh wire forms the fourth outside lead wire and one of the two wires of the fourth winding. Such an embodiment may also be configured such that the first and second wires define interior leads extending from radially innermost layer positions of slots of the second pole, the third and fourth wires define interior leads extending from radially innermost layer positions of slots of the third pole, the fifth and sixth wires define interior leads extending from radially innermost layer positions of slots of the fourth pole, and the seventh and eighth wires define interior leads extending from radially innermost layer positions of a fifth pole, the fifth pole being adjacent the fourth pole with the fourth pole disposed between the third and fifth poles; and wherein each of the interior leads of the first through eighth wires are connected in series to another interior lead to define a reversing end loop wherein each reversing end loop connects a clockwise extending wire to a counterclockwise extending wire.

In embodiments having first through eight wires defining such interior leads, the embodiment may be configured such that the interior lead of the first wire is connected in series to the interior lead of the fourth wire, the interior lead of the second wire is connected in series to the interior lead of the seventh wire, the interior lead of the third wire is connected in series to the interior lead of the sixth wire and the interior lead of the fifth wire is connected in series to the interior lead of the eight wire. Such an embodiment may also be configured such that, for each pole not including an exterior lead wire or an interior lead, the pole includes one slot wherein the first wire is in the first layer position, the third wire is in the second layer position, the fifth wire is in the third layer position and the seventh wire is in the fourth layer position and, in another slot of the pole, the second wire is in the first layer position, the fourth wire is in the second layer position, the sixth wire is in the third layer position and the eighth wire is in the fourth layer position. Such embodiments may be further configured such that each pole is defined by windings which are sufficient to fill two slots and wherein each pole includes windings disposed in three adjacent slots. Such embodiments may be still further configured such that each of the first through eighth wires by itself does not provide an electrically balanced winding, but each of the first through fourth windings provides an electrically balanced winding.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION

Figure 3:
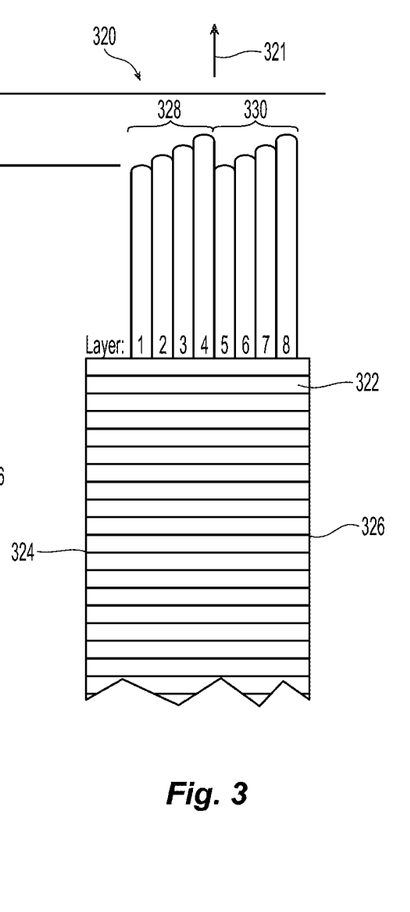
FIG. 3 is a schematic view of the end turns of a stator with an improved winding pattern.

FIG. 3 is a schematic view of the end turns 320 extending in an axial direction 321 from laminations 322 of a stator having an efficient end turn configuration. Laminations 322 have a radially outer surface 324 and a radially inner surface 326. End turns 320 are part of winding wires wherein the winding wires all have the same length.

During assembly, the winding wires may be bent in a fixture (not shown) at precise points along their lengths and thereby provided with end turns 320 before being inserted into the slots of laminations 322. After insertion of the windings into the slots of laminations 322, the heights of end turns 320 have two groups or tiers, including an outer group 328 encompassing layers 1-4, and an inner group 330 encompassing layers 5-8. Within group 328, an outermost end turn 320 in layer 1 has the smallest height, and an innermost end turn 320 in layer 4 has the largest height. Similarly, within group 330, an outermost end turn 320 in layer 5 has the smallest height, and an innermost end turn 320 in layer 8 has the largest height.

Figure 4:
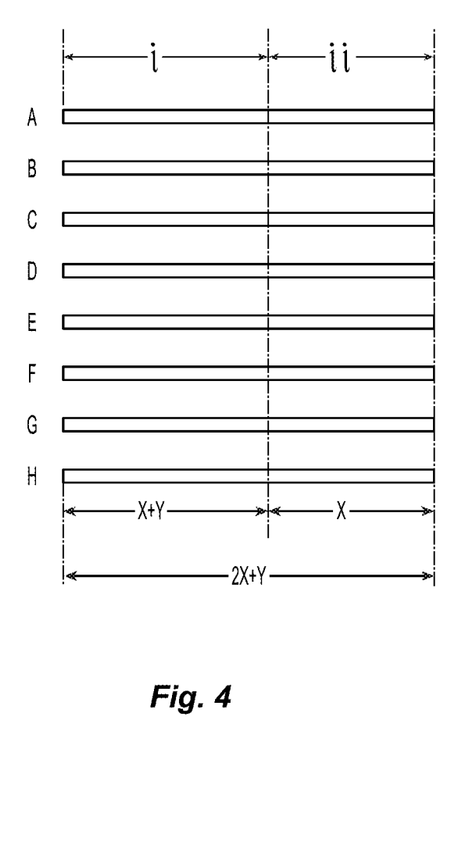
FIG. 4 is a chart of the lengths of the wires and wire segments of the stator of FIG. 3.

FIG. 4 schematically depicts the lengths of the wires and wire segments of the stator of FIG. 3 with the wires laid out in a linear length without any bends. The stator includes eight wires A-H, with wires A and D being connected in series to form a first winding; wires B and G being connected in series to form a second winding; wires C and F being connected in series to form a third winding; and wires E and H being connected in series to form a fourth winding. Each wire A-H defines two full 360 degree wraps around the stator.

Each wire has an equal total linear length of $2x+y$, including a wire segment $i$ having a linear length of $x+y$, and a wire segment $ii$ having a linear length of $x$. Each of these two segments correspond to one full 360 degree wrap about the stator. In other words, each of the wire segments $i$ forms a 360 degree wrap and each of the wire segments $ii$ forms a 360 degree wrap.

Figure 5:
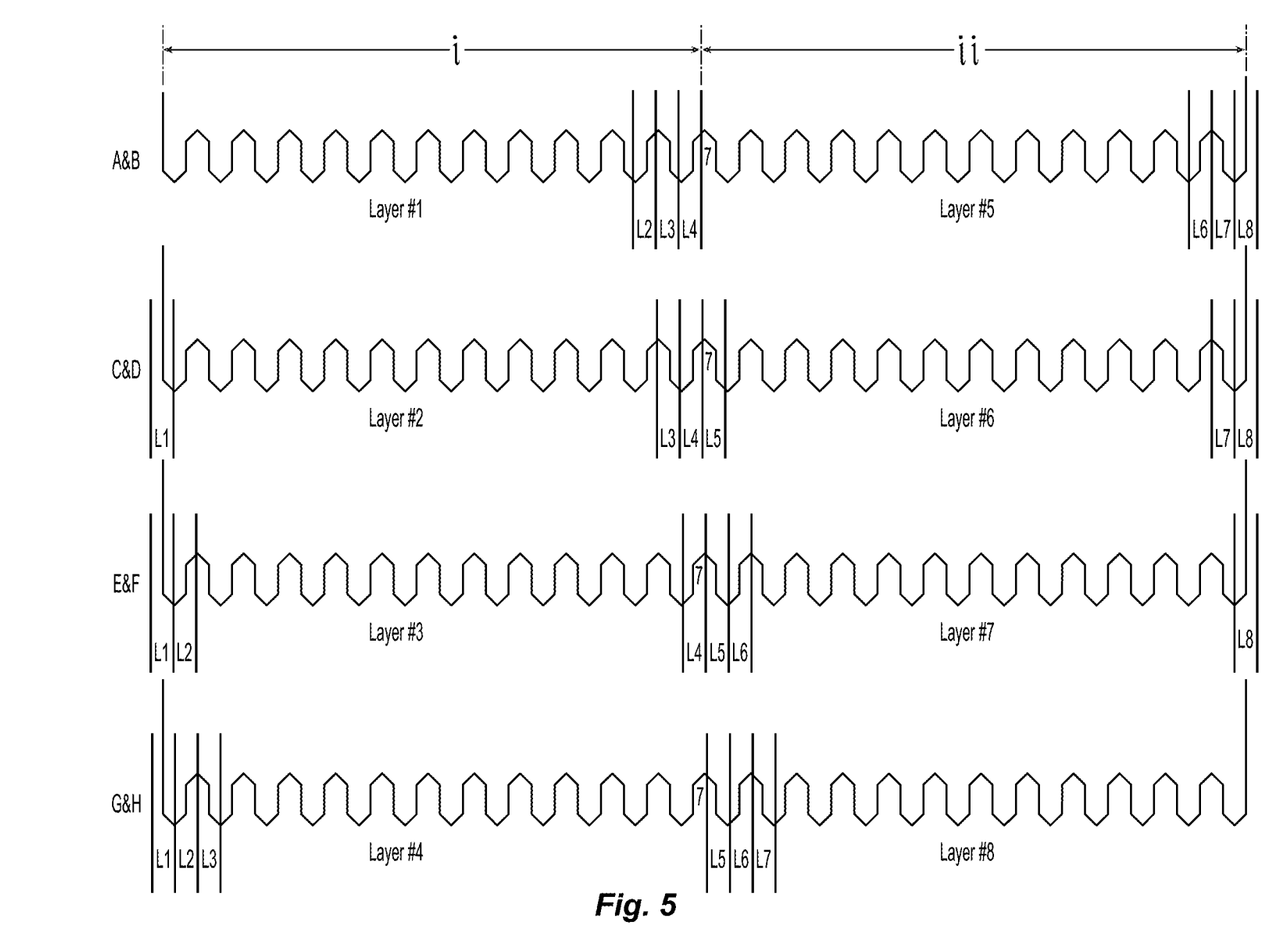
FIG. 5 is a winding diagram of the stator of FIG. 3.

As shown in the winding diagram of FIG. 5, the longer wire segments $i$ are primarily in either layer 1, 2, 3 or 4, and the shorter wire segments $ii$ are primarily in either layer 5, 6, 7 or 8. That is, most of the length of each of the longer wire segments $i$ is in either layer 1, 2, 3 or 4, and most of the length of each of the shorter wire segments $ii$ is in either layer 5, 6, 7 or 8. As shown in FIG. 3, layer 1 is the radially outermost layer, and layer 8 is the radially innermost layer. As also shown in FIG. 3, each of layers 1-4 is farther radially outward than each of layers 5-8.

Turning to FIG. 3, it can be seen that the winding wire end heights increase from layer 1 to layer 4. This is because each winding wire end in layers 1-4 for a single 360 degree wrap of the winding wire about the stator core is formed from a respective wire segment $i$, wherein each wire segment $i$ has a same length, but the distance that the wire end spans decreases from layer 1 to layer 4 due to the smaller circumferential distances associated with more radially inward layers. Beginning with layer 5, the wire end height drops back down to the same height as layer 1 due to each 360 degree wrap of the winding wire predominately disposed in layers 5-8 being formed from a respective one of the shorter, but equal-length wire segments $ii$. However, the winding wire end heights increase from layer 5 to layer 8, just as they do from layer 1 to layer 4, due to the smaller circumferential distances associated with more radially inward layers. A comparison of FIGS. 1 and 3 illustrates that the present invention advantageously provides a lower maximum wire end height than does the prior art stator of FIG. 1 wherein every wrap, regardless of layer, is formed by a wire segment of equal length. Further advantageously, the present invention provides wires A-H of equal lengths, which simplifies manufacturing, although each wire A-H includes two wire segments *i* and *ii* of unequal lengths. Also advantageous is that each wire A-H has its end turns formed in the same jig whereby all of the wires A through H are interchangeable in the manufacturing process. It is noted that the shifting between layers for each of the wires may differ, however, this is accounted for when loading the wires in a linear magazine before then forming the arranged wires into a cylinder and inserting them into the slots of the stator. These manufacturing efficiencies compare favorably to the prior art stator of FIG. 2.

With regard to FIG. 5, it is also noted that the difference in length between the wraps formed by segments *i* and the wraps formed by segments *ii* is due to the different wraps having different length end turns formed therein. When forming the wires in a jig, the longer end turns may take the form of either wider or taller end turns. When inserting the wires in the stator core, the wires may be subject to further bending with the longer length of the end turns in the outer radial layers being able to account for the larger circumferential distance between slots of the outer radial layers. In the illustrated embodiment, the end turns of the wrap having a longer length are taller than the end turns of the other wrap after the wire has been bent in the jig to form the end turns.

Once the wires the illustrated embodiment have been installed in the stator, however, the end turns of each individual wire have an equal height. For example, wires A and B have their longer wire segments *i* forming a 360 degree wrap in layer 1 and their shorter wire segments *ii* forming a 360 degree wrap in layer 5. Similarly, wires C and D have their longer wire segments *i* forming a 360 degree wrap in layer 2 and their shorter wire segments *ii* forming a 360 degree wrap in layer 6; wires E and F have their longer wire segments *i* forming a 360 degree wrap in layer 3 and their shorter wire segments *ii* forming a 360 degree wrap in layer 7; and wires G and H have their longer wire segments *i* forming a 360 degree wrap in layer 4 and their shorter wire segments *ii* forming a 360 degree wrap in layer 8.

Figure 6:
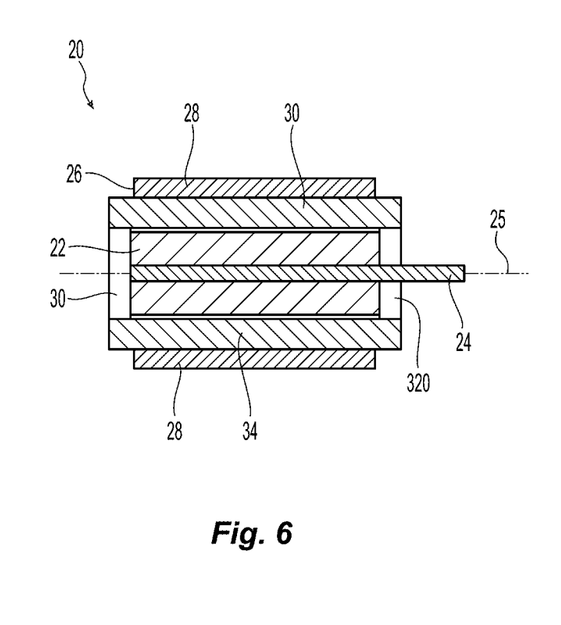
FIG. 6 is a cross sectional view of an electric machine.

This exemplary winding pattern provides an electrically balanced stator and further described below with the aid of FIGS. 5-8. FIG. 5 illustrates eight separate wires A, B, C, D, E, F, G and H wherein wires A and B share an identical winding diagram; wires C and D share an identical winding diagram; wires E and F share an identical winding diagram; and wires G and H share an identical winding diagram. Moreover, as mentioned above, wire A is connected in series with wire D to form a first winding; wire B is connected in series with wire G to form a second winding; wire C is connected in series with wire F to form a third winding; and wire E is connected in series with wire H to form a fourth winding. Each of wires A-G includes two wraps. That is, each of wires A-H circumscribes the stator twice. The first, second, third and fourth windings are then connected in parallel to form one phase of electric machine 20 (FIG. 6). Electric machine 20 is a three-phase electric machine, and thus two additional phases having the same winding arrangement as that formed by wires A-H are also employed with electric machine 20.

Figure 8:
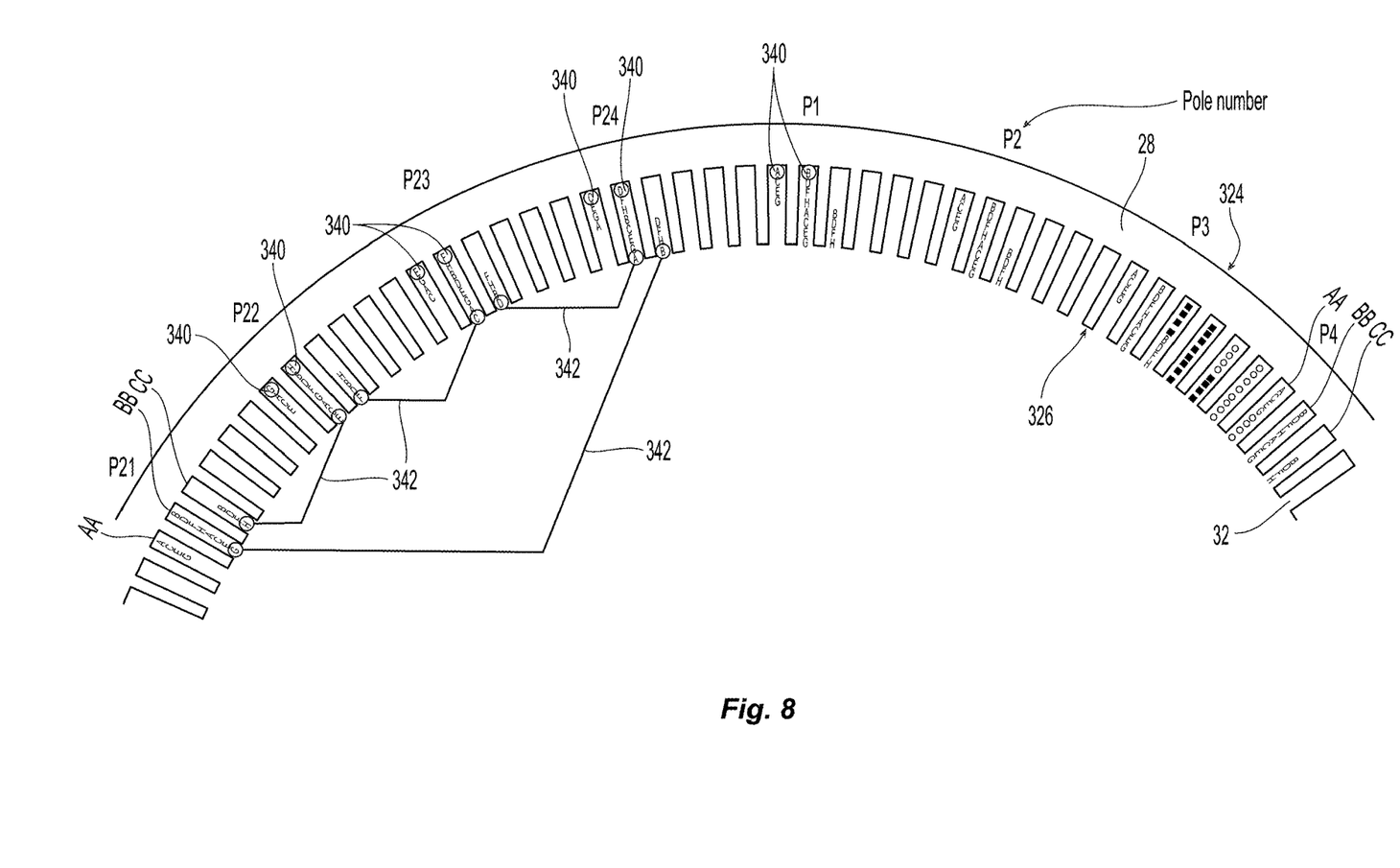
FIG. 8 is a detail view of a portion of the stator diagram of FIG. 7.

In the illustrated embodiment, electric machine 20 is an automotive hybrid motor capable of operating as a motor or as a generator, however, alternative embodiments may take the form of an electric machine that is solely operable as a motor or solely operable as a generator. Electric machine 20 includes a rotor 22 mounted on a shaft 24 which both rotate relative to stator 26 and define a rotational axis 25 of electric machine 20. Stator 26 has a stator core 28 and a plurality of windings 30. Stator core 28 is formed out of a stack of laminations 322 and defines a plurality of slots 32 (FIG. 8). Windings 30 include axially extending segments 34 that are disposed within slots 32 and end turns 320 with each end turn 320 connecting a pair of slot segments 34.

The illustrated embodiment is a three-phase electric machine with four turns or wraps per winding. Additionally, each phase includes four windings arranged in parallel. In other words, each winding extends about the full circumference of the stator core four times and there are four such windings for each phase. To achieve this arrangement, two separate wires or filars are used for each winding whereby a total of sixteen separate wraps are employed for each phase. Each of the individual wires A-H form two turns about the stator and is connected in series with another one of the wires A-H to thereby form one of the four windings of each phase. For example, wire A is connected in series with wire D to form one of the four windings.

One parameter that may be used to describe a winding arrangement is slots per pole per phase. This is equal to the number of slots per pole in each slot group of the winding if each such slot were filled solely by windings of one phase. For example, in the illustrated embodiment, there are 16 slot segments in each pole and each slot holds 8 slot segments. Therefore, the illustrated arrangement has two slots per pole per phase. The illustrated embodiment, however, has what is known as a phase shift and some slots hold slot segments of two different phases.

The use such phase shifting can reduce what is known as the skin effect. As a general rule, when the conductors in a particular slot carry different phase currents, the skin effect in such conductors will be less than if all of the conductors in the slot carried the same phase current. While such phase shifting reduces the skin effect, the use of such phase shifting can make it more difficult to electrically balance the windings.

To avoid or minimize a re-circulating current in the winding, it is desirable for the winding to be electrically balanced. This is particularly true for a winding having a plurality of wires connected in parallel.

The illustrated embodiment provides a stator winding pattern which provides a stator with phase shifting and windings arranged in parallel for each phase. As mentioned above, the illustrated winding pattern includes four turns and four separate windings for each phase. The pattern has enough slot segments to fill two slots per pole per phase, but the windings occupy three physical slots for each pole or slot group. In each slot group, the center slot has eight conductors which are all from the same phase. The two outer slots each have four conductors from one phase and four additional conductors from a different phase. To electrically balance the stator, each slot of the slot group needs to have an equal number of conductors from each of the four windings. It is also desirable for each of the different radial layers to have an equal number of conductors from each of the four windings. This radial balancing, however, is less important than the balancing between slots. The exemplary winding pattern can be used to provide an electrically balanced stator and is further described below with the aid of FIGS. 5, 7 and 8. While such electrical balancing is often beneficial, it is not necessary for all embodiments of the winding arrangement taught herein.

Figure 7:
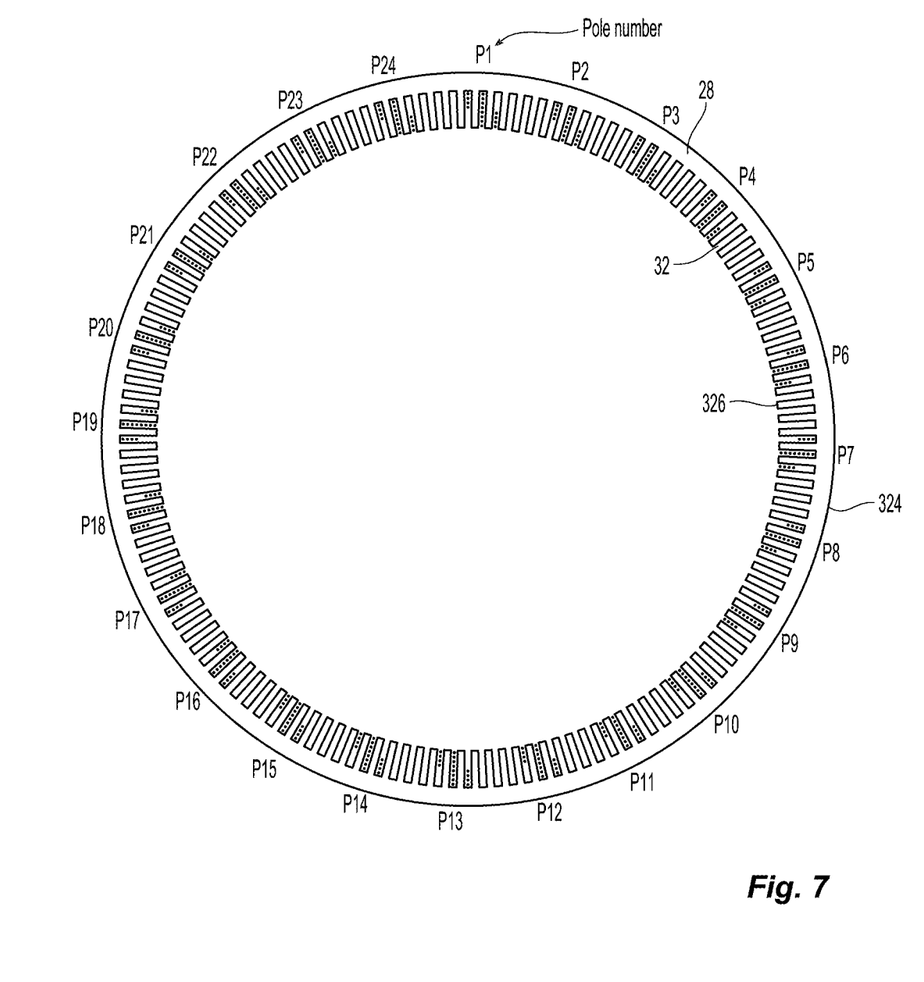
FIG. 7 is a top view of a stator diagram illustrating the arrangement of the wires of the stator of FIG. 3.

As can be seen in FIG. 7, each phase of the stator assembly defines 24 poles, i.e., poles P1 through P24, with each pole occupying three physical slots 32 in the stator core. Eight wires fit within each axially extending stator slot 32. As used herein, the radially outermost wire is in layer 1, layer 2 being the next radially inward wire position and so on with the radially innermost wire position being layer 8.

As can also be seen in FIG. 7, as well as FIG. 8, each of the poles occupies a group of three slots wherein the central slot is completely filled with windings (eight windings in the illustrated embodiment) and two outer slots that are only half filled with windings from a particular phase (four windings in the illustrated embodiment) to thereby form a 4-8-4 winding pattern. As used herein, and as labelled in FIG. 8 for pole P21 and pole P4, for the three slots occupied by each pole, the most counterclockwise slot is labelled slot AA, the center slot is BB and the most clockwise slot is CC. In other words, starting at the outer slot on the counterclockwise side of each pole and moving clockwise, the slots are referred to as slot AA, slot BB, and slot CC with slot BB forming the central slot and slots AA and CC forming the outer slots.

The distance between slot AA of one pole and slot AA of the adjacent poles is 6 slots. Similarly, the distance between slot BB of one pole and slot BB of the adjacent poles is 6 slots and the distance between slot CC of one pole and slot CC of the adjacent poles is 6 slots. This distance between corresponding slots of the slot groups forming adjacent poles defines the standard pitch of the electric machine. In the illustrated embodiment, the standard pitch is 6 slots.

Returning to FIG. 5, the winding diagram labels any pitch between slot segments that is non-standard. In this embodiment, the end loops forming the non-standard pitches are located at a same axial end of the stator. It is also noted that the winding diagram of FIG. 5 also indicates in which layer position the wires are located. As can be seen in FIG. 5, each wire includes one end loop having a pitch of 7 with all of the other end loops having a standard pitch of 6. The non-standard end loop will shift the winding from one of slots AA, BB or CC to another one of these slots as will be recognized by those having ordinary skill in the art. This type of non-standard end loop is often referred to as a phase shift end loop and can be done to electrical balance the windings.

As most easily seen in FIGS. 7 and 8, the windings in slot AA are positioned in the radial outermost layers, i.e., layers 1-4, while the windings in slot CC are positioned in the radial innermost layers, i.e., layers 5-8. Because all of the phases have this same pattern, slot AA of one phase corresponds to and overlaps with slot CC of an adjacent phase, resulting in the outer slots being completely filled with eight windings. FIGS. 7 and 8 illustrate the windings of only one phase except for the space between poles P3 and P4 of FIG. 8. This portion of FIG. 8 illustrates the location of the windings from a second phase (indicated by filled-in squares) and the location of the windings from a third phase (indicated by the hollow circles). This clearly shows how the outer slots of each phase overlap such that each outer slot includes windings from two different phases.

It is further noted that while the outer slots of the illustrated embodiment have windings wherein the windings from one phase are all positioned in the radially outermost layers and the windings from the other phase are all positioned in the radially innermost layers, other configurations are also possible. For example, the windings from the different phases could alternate. In the illustrated embodiment, this could be achieved by inserting windings from a same phase in layers 1, 3, 5 and 7 in slot AA and in layers 2, 4, 6 and 8 in slot CC. Such an arrangement, however, may be more difficult to manufacture than the illustrated embodiment and could require a more complex winding pattern.

To control the position of the windings in the pole slots, special non-standard pitch end loops referred to herein as phase shift end loops are used. The phase shift end loops are all one slot greater than the standard pitch end loops in the illustrated embodiment and thereby shift the wire from an AA slot to a BB slot or from a BB slot to a CC slot.

For example, in FIG. 5, at the point where wires A, B, C, D, E, F, G and H transition between layer 4 and layer 5, the end loops have a 7-pitch end loop that function as phase shift end loops. In other words, when the windings shift between layer 4 and layer 5 the wires are also shifting between filling the two most counterclockwise slots of each pole (AA and BB) to filling the two most clockwise slots (BB and CC) of each pole. This is also seen in FIG. 8 wherein at pole 21 in layer 4, wire G is in slot AA and wire H is in slot BB. As a result of the 7-pitch phase shift end loops, wire G is in slot BB and wire H is slot CC at pole P22 in layer 5. In the illustrated example, these phase shift end loops occur at the point where the windings transition from layer 4 to layer 5. This is necessary to maintain the pattern wherein the windings are in slots AA and BB in layers 1-4 and are in slots BB and CC in layers 4-8. If an alternating pattern were employed for the two different phases in the outer slots, a larger number of phase shift end loops would be required. It is also noted that the phase shift end loops having a pitch other than 7 could be employed. For example, a 9 pitch end loop would move a winding from slot AA to slot CC, and end loops having a pitch of 5 or 6 could move a winding in the opposite direction.

To provide an electrically balanced winding pattern, each of the parallel windings needs to be in central slot BB an equal number of times and needs to be in each outer slot AA, CC, an equal number of times. For the illustrated embodiment, the fill ratio between the central slot BB and the outer slots AA, CC is 2:1 and, thus, each winding needs to be disposed in the central slot twice as many times as it is disposed in outer slot AA and it needs to be in outer slot CC the same number of times that is in outer slot AA. For a stator having more slots per pole per phase, the same general principles apply for the parallel wires to be electrically balanced.

While the described phase change end loops are used to electrically balance the windings, it is noted that the wires A, B, C, D, E, F, G and H are not individually electrically balanced but once they are serially connected in pairs, the four resulting parallel windings are electrically balanced. In other words, each winding is formed by a series connection between two individually unbalanced wires to form a balanced winding.

The wires are connected together at their interior or finish ends, the finish ends are identified in FIG. 8 by the circled letters in layer 8. As indicated by the connecting lines 342 in FIG. 8, the end of wire A extending from layer 8 at pole P24 is connected in series with the end of wire D extending from layer 8 at pole P23; the end of wire B extending from layer 8 at pole P24 is connected in series with the end of wire G extending from layer 8 at pole P21; the end of wire C extending from layer 8 at pole P23 is connected in series with the end of wire F extending from layer 8 at pole P22; and the end of wire E extending from layer 8 at pole P22 is connected in series with the end of wire H extending from layer 8 at pole P21. It is further noted that in the illustrated embodiment, each of the series connections, i.e., between A and D, between B and G, between C and F, and between E and H, is also a reversing connection with one of the wires extending in a clockwise direction about the stator from the series connection and the other wire extending in a counterclockwise direction about the stator from the series connection.

The exterior or start leads 340 of each of the wires are indicated in FIG. 8 by the circled letters in layer 1 and are found at poles P22, P23, P24 and P1. The start leads are connected with an external circuit member. The external circuit member may be a neutral connection, a regulator, inverter or other circuit member depending upon the application for which the electric machine will be used. The start leads of the A and B wires both extend from layer 1 of pole P1 with wire A being in slot AA of pole P1 and wire B being in slot BB of pole P1, the start leads of the E and F wires both extend from layer 1 of pole P23 with wire E being in slot AA of pole P23 and wire F being in slot BB of pole P23. Similarly, the start leads of the C and D wires both extend from layer 1 of pole P24 with wire C being in slot AA of pole P24 and wire D being in slot BB of pole P24, the start leads of the G and H wires both extend from layer 1 of pole P22 with wire G being in slot AA of pole P22 and wire H being in slot BB of pole P22. In the illustrated embodiment, these external start leads are intended to be connected such that they form four parallel windings per phase. The windings including a first winding (formed by the series connected pair of wires A and D), a second winding (formed by the series connected pair of wires B and G), a third winding (formed by the series connected pair of wires E and H), and a fourth winding (formed by the series connected pair of wires C and F).

As shown in slot AA of pole P1 in FIG. 8, wire A is disposed in the first layer position, wire C is disposed in the second layer position, wire E is disposed in the third layer position and wire G is disposed in the fourth layer position. Wire A includes an outside lead wire 340 extending from slot AA in pole P1. Wire C includes an outside lead wire 340 extending from slot AA in pole P24. Wire E includes an outside lead wire 340 extending from slot AA in pole P23. Wire G includes an outside lead wire 340 extending from slot AA in pole P22. Poles P1, P24, P23 and P22 are consecutive and adjacent to each other.

As can also be seen in FIG. 8 and similar to slot AA, in slot BB of pole P1, wire B is disposed in the first layer position, wire D is disposed in the second layer position, wire F is disposed in the third layer position and wire H is disposed in the fourth layer position. Wire B includes an outside lead wire 340 extending from slot BB in pole P1. Wire D includes an outside lead wire 340 extending from slot BB in pole P24. Wire F includes an outside lead wire 340 extending from slot BB in pole P23. Wire H includes an outside lead wire 340 extending from slot BB in pole P22. Poles P1, P24, P23 and P22 are consecutive and adjacent to each other.

At pole P1, in slots AA and BB, wires A and B are in the first layer position, wires C and D are in the second layer position, wires E and F are in the third layer position and wires G and H are in the fourth layer position. As mentioned above, outside leads 340 for wires A and B are in pole P1, outside leads 340 for wires C and D are in pole P24. Outside leads 340 for wires E and F are in pole P23. Outside leads for wires G and H are in pole P22. Each of the outside lead wires 340 are located in layer 1.

In pole P24, in slots AA and BB wires A and B are in the fourth layer position, wires C and D are in the first layer position, wires E and F are in the second layer position, and wires G and H are in the third layer position. In pole P23, in slots AA and BB wires A and B are in the third layer position, wires C and D are in the fourth layer position, wires E and F are in the first layer position, and wires G and H are in the second layer position.

This arrangement has wires G and H in the first layer position of pole P22 these wires then shift to layer 2 at pole P23, then to layer 3 at pole P24 and finally to layer 4 at pole P1. From pole P1, wires G and H remain in layer 4 up to and including pole P21 and then shift to layer 5 at pole P22. Wires G and H also have a phase shift when moving from pole P21 to pole P22 with wire G moving from slot AA to slot BB and wire H moving from slot BB to slot CC. Wires G and H shift to layer 6 at pole P23, then to layer 7 at pole P24 and finally to layer 8 at pole P1. These movements of wires G and H can be most easily understood with reference to FIGS. 5 and 8.

It is noted that FIG. 5 shows only a single wire for G and H, this is because each of these wires have the same pattern but are merely shifted one slot over in each pole. In other words, wire G is always in the same layer position as wire H in each pole with wires G and H in adjacent physical slots with wire G being located in the slot disposed one slot counterclockwise of the slot of wire H. Similarly, wires A and B are in the same layer of adjacent slots of each pole, wires C and D are in the same layer of adjacent slots of each pole and wires E and F are in the same layer of adjacent slots of each pole.

As can also be understood with reference to FIGS. 5 and 8, when shifting layer positions, the wires move one layer per pole. For example, when wires A and B move from layer 1 to layer 5, the wires first move from layer 1 at pole P21, to layer 2 at pole P22, to layer 3 at pole P23, to layer 4 at pole P24 to layer 5 at pole P1. The other wires make a similar progression from layers 2-4 to layers 6-8 at poles P21-P24. The wires also include a 7 slot phase shift end loop at this layer shift whereby they move from slots AA and BB to slots BB and CC. This 7 slot phase shift end loop occurs between poles P24 and P1 for all of the wires. In this regard, it is noted that the different wires are not aligned vertically in FIG. 5. In other words, the exterior lead of wires C and D is shown immediately below the exterior leads of wires A and B, however, the exterior leads of C and D extend from pole P24 while the leads of wires A and B extend from pole P1. Similarly, wires E and F extend from pole P23 and G and H from pole P22. Thus, the multi-step layer movement of each of the wires occur at the same poles even though FIG. 5 does not show such steps in vertical alignment.

At the end of each of the wires, the wires shift layer positions such that the interior lead of each wire extends from the radially innermost layer, i.e., layer 8 in the illustrated embodiment. Wires G and H do not require any layer shifting and have interior leads extending from pole P21. Wires E and F shift from layer 7 to layer 8 at pole P22 where they have interior leads. Wires C and D progressively shift from layer 6 at pole P21 to layer 8 at pole P23 where they define interior leads and wires A and B progressively shift from layer 5 at pole P21 to layer 8 at pole P24 where they define interior leads. The other two phases of electric machine 20 have the same winding pattern.

Figure 9A:
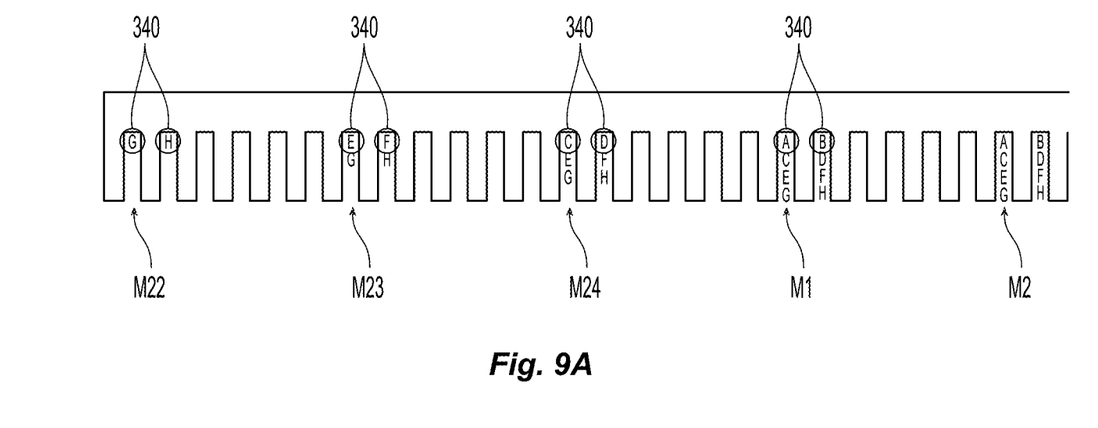
FIG. 9A is a diagram of a linear magazine load for one phase of the stator of FIG. 3.
Figure 9B:
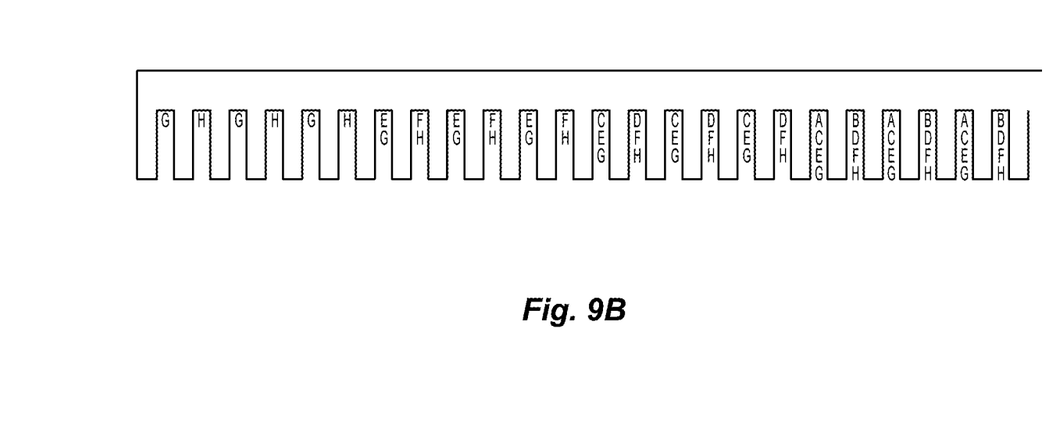
FIG. 9B is a diagram of a linear magazine load for three phases of a stator of FIG. 3.

FIG. 9A illustrates a phase-shifted, unstratified linear magazine load for one phase of the stator of FIGS. 3-8. FIG. 9B illustrates a phase-shifted, unstratified linear magazine load for all three phases of the stator of FIGS. 3-8.

In FIG. 9A, M22 indicates slots associated with pole P22, M23 indicates slots associated with pole P23, M24 indicates slots associated with pole P24, M1 indicates slots associated with pole P1 and M2 indicates slots associated with pole P2.

When placing wires A-H in the linear magazine, wires A and B are installed first with external leads 340 in slots located at M1 and retain the same layer position for the entire magazine. Then wires C and D are installed with their external leads 340 at M24. Wires C and D shift one layer due to the presence of wires A and B in slots M1 and onward. Then wires E and F are installed with their external leads 340 at M23. Wires E and F shift one layer at M 24 and an additional layer at M1 due to the presence of wires C, D and A, B. Then wires G and H are installed with their external leads 340 at M22. Wires G and H progressive shift a layer as they move from M23 to M1. The arrangement of the wires in the magazine remains the same as that for M1 and M2 until the windings reach their finish or interior ends. At the interior ends, wires G and H terminate first at magazine slots corresponding to pole P21, then wires E and F terminate at magazine slots corresponding to pole P22, then wires C and D terminate at magazine slots corresponding to pole P23 and wires A and B terminate at magazine slots corresponding to pole P24.

After loading the windings for the first phase, the windings for the second phase and then the windings for the third phase are loaded in the linear magazine. After loading the magazine with the windings from all three phases, the windings are removed and bent into a generally cylindrical shape so that they can be inserted into the central opening of the stator core. The end of the windings having the external leads 340 are then inserted into slots 32 and the insertion process proceeds around the stator core to subsequently insert the second wraps of the windings. For poles P22 through P24, these slots will only be partially filled by the lead end of the wires that form external leads 340 and the remainder of these slots are filled by the tail end of the windings which form the interior ends. These interior ends are then welded as indicated by reference numbers 342 in FIG. 8 to complete the installation of the windings.

While this invention has been described as having an exemplary design, the present invention may be further modified within the spirit and scope of this disclosure. This application is therefore intended to cover any variations, uses, or adaptations of the invention using its general principles.

What is claimed is:

1. A multi-phase electric machine comprising:
   a stator operably coupled with a rotor wherein the rotor is rotatable relative to the stator, the stator including a stator core and a plurality of windings defining a plurality of phases;
   the stator core defining a plurality of axially and radially extending slots which circumscribe the stator core and encircle a rotational axis of the electric machine, each of the slots defining a plurality of layer positions located at different radial distances from the rotational axis; and
   the plurality of windings mounted in the slots of the stator core with each phase of plurality of phases defining a plurality of poles circumferentially distributed about the stator core, each pole being defined by a group of axially extending winding segments of the same phase disposed in adjacent slots, each phase including at least three of the plurality of windings;
   wherein, for each one of the phases, in a designated slot of a first pole, a first winding is disposed in a first layer position, a second winding is disposed in a second layer position, and a third winding is disposed in a third layer position, the first winding defining a first lead wire extending from the designated slot of the first pole;
   the second winding defining a second lead wire extending from a designated slot of a second pole and wherein the third winding is disposed in the designated slot of the second pole; and
   the third winding defining a third lead wire extending from a designated slot of a third pole;
   wherein the first lead wire, the second lead wire and the third lead wire are each adapted to be connected to an external circuit member; and
   wherein the first pole, the second pole, and the third pole form circumferentially sequential poles of a respective one of the phases with the second pole being disposed between the first pole and the third pole and wherein the first layer position is a radially outermost layer position, the second layer position is disposed radially inward of the first layer position, and the third layer position is disposed radially inward of the second layer position.

2. The electric machine of claim 1 wherein each of the first, second and third windings is respectively formed by two wires connected in series, wherein a first end of a first one of the two wires for each of the first, second and third windings respectively defines the first lead wire, the second lead wire and the third lead wire and wherein, a second end of the first wire for the first winding defines a first interior lead extending from a radially innermost layer position of the second pole, a second end of the first wire for the second winding defines a second interior lead extending from the radially innermost layer position of the third pole and a second end of the first wire for the third winding defines a third interior lead extending from the radially innermost layer position of a fourth pole, the fourth pole being circumferentially sequentially arranged with the third pole in the respective one phase with the third pole disposed between the fourth and second poles.

3. The electric machine of claim 2 wherein the windings of each phase define at least six interior leads and the first, second and third interior leads are each connected to another interior lead extending from a radially innermost layer position to define a reversing end loop wherein each reversing end loop connects a clockwise extending wire to a counterclockwise extending wire.

4. The electric machine of claim 1 wherein the respective one phase includes a fourth winding, the fourth winding defining a fourth lead wire extending from a designated slot of a fourth pole, the fourth pole being circumferentially sequentially arranged with the third pole in the one phase with the third pole disposed between the fourth and second poles, the fourth winding being disposed in the designated slot of the third pole, in the designated slot of the second pole and in the designated slot of the first pole.

5. The electric machine of claim 4 wherein each of the first, second, third and fourth windings is respectively formed by two wires connected in series, wherein a first end of a first one of the two wires for each of the first, second, third and fourth windings respectively defines the first lead wire, the second lead wire, the third lead wire, and the fourth lead wire and wherein, a second end of the first wire for the first winding defines a first interior lead extending from a radially innermost layer position of the second pole, a second end of the first wire for the second winding defines a second interior lead extending from the radially innermost layer position of the third pole, a second end of the first wire for the third winding defines a third interior lead extending from the radially innermost layer position of the fourth pole, and the a second end of the first wire for the fourth winding defines a fourth interior lead extending from the radially innermost layer position of a fifth pole, the fifth pole being adjacent the fourth pole with the fourth pole disposed between the fifth and third poles.

6. The electric machine of claim 5 wherein the windings of each phase define at least eight interior leads and the first, second, third and fourth interior leads are each connected to another interior lead extending from a radially innermost layer position to define a reversing end loop wherein each reversing end loop connects a clockwise extending wire to a counterclockwise extending wire.

7. The electric machine of claim 1 wherein each pole is defined by windings which are sufficient to fill two slots and wherein each pole includes windings disposed in three adjacent slots.

8. The electric machine of claim 1 wherein each of the first, second and third windings are formed by two wires connected in series, wherein:
  first and second wires extend from the first layer position of different slots of the first pole to define lead wires;
  third and fourth wires are disposed in the second layer position of the different slots of the first pole and are extend from the first layer position of different slots of the second pole to define lead wires;
  fifth and sixth wires are disposed in the third layer position of the different slots of the first pole and are disposed in the second layer position of the different slots of the second pole and extend from the first layer position of different slots of the third pole to define lead wires; and
  wherein the first wire forms the first lead wire and one of the two wires of the first winding, the third wire forms the second lead wire and one of the two wires of the second winding, and the fifth wire forms the third lead wire and one of the two wires of the third winding.

9. The electric machine of claim 8 wherein the first and second wires define interior leads extending from radially innermost layer positions of slots of the second pole, the third and fourth wires define interior leads extending from radially innermost layer positions of slots of the third pole and the fifth and sixth wires define interior leads extending from radially innermost layer positions of slots of a fourth pole, the fourth pole being adjacent the third pole with the third pole disposed between the second and fourth poles; and
  wherein each of the interior leads of the first through sixth wires are connected in series to another interior lead to define a reversing end loop wherein each reversing end loop connects a clockwise extending wire to a counterclockwise extending wire.

10. The electric machine of claim 9 wherein, for each pole not including a lead wire or an interior lead, the pole includes one slot wherein the first wire is in the first layer position, the third wire is in the second layer position and the fifth wire is in the third layer position and, in another slot of the pole, the second wire is in the first layer position, the fourth wire is in the second layer position and the sixth wire is in the third layer position.

11. The electric machine of claim 8 wherein the respective one phase includes a fourth winding formed by two wires connected in series, the fourth winding defining a fourth lead wire extending from a designated slot of a fourth pole, the fourth pole being adjacent the third pole with the third pole disposed between the fourth and second poles, the fourth winding being disposed in the first layer position in the designated slot of the fourth pole, in the second layer position in the designated slot of the third pole, in the third layer position in the designated slot of the second pole and in the fourth layer position in the designated slot of the first pole, the fourth layer position being disposed radially inwardly of the third layer position;
  wherein the windings of the respective one phase further include a seventh wire and an eighth wire wherein the seventh and eighth wires are disposed in the fourth layer position of the different slots of the first pole and are disposed in the third layer position of the different slots of the second pole and are disposed in second layer position of the different slots of the third pole and extend from the first layer position of different slots of the fourth pole to define outside lead wires; and
  wherein the seventh wire forms the fourth outside lead wire and one of the two wires of the fourth winding.

12. The electric machine of claim 11 wherein the first and second wires define interior leads extending from radially innermost layer positions of slots of the second pole, the third and fourth wires define interior leads extending from radially innermost layer positions of slots of the third pole, the fifth and sixth wires define interior leads extending from radially innermost layer positions of slots of the fourth pole, and the seventh and eighth wires define interior leads extending from radially innermost layer positions of a fifth pole, the fifth pole being adjacent the fourth pole with the fourth pole disposed between the third and fifth poles; and
  wherein each of the interior leads of the first through eighth wires are connected in series to another interior lead to define a reversing end loop wherein each reversing end loop connects a clockwise extending wire to a counterclockwise extending wire.

13. The electric machine of claim 12 wherein the interior lead of the first wire is connected in series to the interior lead of the fourth wire, the interior lead of the second wire is connected in series to the interior lead of the seventh wire, the interior lead of the third wire is connected in series to the interior lead of the sixth wire and the interior lead of the fifth wire is connected in series to the interior lead of the eight wire.

14. The electric machine of claim 13 wherein, for each pole not including a lead wire or an interior lead, the pole includes one slot wherein the first wire is in the first layer position, the third wire is in the second layer position, the fifth wire is in the third layer position and the seventh wire is in the fourth layer position and, in another slot of the pole, the second wire is in the first layer position, the fourth wire is in the second layer position, the sixth wire is in the third layer position and the eighth wire is in the fourth layer position.

15. The electric machine of claim 14 wherein each pole is defined by windings which are sufficient to fill two slots and wherein each pole includes windings disposed in three adjacent slots.

16. The electric machine of claim 15 wherein each of the first through eighth wires by itself does not provide an electrically balanced winding, but each of the first through fourth windings provides an electrically balanced winding.

17. The electric machine of claim 1 wherein each of the first, second and third windings includes two wires connected in series at interior leads extending from a radially innermost layer position, each of the series connections between the interior leads defining a reversing end loop wherein each reversing end loop connects a clockwise extending wire to a counterclockwise extending wire.

* * * * *